(12) United States Patent
Xie et al.

(10) Patent No.: US 6,212,008 B1
(45) Date of Patent: Apr. 3, 2001

(54) COMPACT POLARIZATION INSENSITIVE CIRCULATORS WITH SIMPLIFIED STRUCTURE AND LOW POLARIZATION MODE DISPERSION

(75) Inventors: Ping Xie; Yonglin Huang, both of San Jose, CA (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 09/281,743

(22) Filed: Mar. 30, 1999

Related U.S. Application Data
(60) Provisional application No. 60/108,214, filed on Nov. 13, 1998.

(51) Int. Cl.[7] .................................................. G02B 5/30
(52) U.S. Cl. ........................... 359/484; 359/494; 359/495; 359/497; 359/900; 385/11
(58) Field of Search ...................................... 359/484, 494, 359/495, 496, 497, 900; 385/11

(56) References Cited

U.S. PATENT DOCUMENTS

| | | | |
|---|---|---|---|
| 3,781,714 | 12/1973 | Schlossberg | 331/94.5 |
| 4,294,509 | 10/1981 | Nagao . | |
| 4,464,022 | 8/1984 | Emkey . | |
| 4,548,478 | 10/1985 | Shiraski | 350/377 |
| 4,554,449 | 11/1985 | Taniuchi et al. | 250/227 |
| 4,720,162 | 1/1988 | Mochizuki et al. . | |
| 4,741,588 | 5/1988 | Nicia et al. . | |
| 4,761,050 | 8/1988 | Byron . | |
| 4,805,977 | 2/1989 | Tamura et al. . | |
| 4,960,331 | 10/1990 | Goldman et al. | 356/350 |
| 5,033,830 | 7/1991 | Jameson . | |
| 5,089,785 | 2/1992 | Hand | 328/233 |
| 5,115,340 | 5/1992 | Tidwell | 359/484 |
| 5,191,467 | 3/1993 | Kapany et al. | 359/341 |
| 5,204,771 | 4/1993 | Koga | 359/281 |
| 5,212,586 | 5/1993 | Van Delden | 359/281 |

(List continued on next page.)

FOREIGN PATENT DOCUMENTS

| | | | |
|---|---|---|---|
| 196 30 737 A1 | 2/1997 | (DE) | G02F/1/39 |
| 0 576 072 A1 | 6/1993 | (EP) | G02B/27/28 |
| 0 653 661 | 5/1995 | (EP) | G02F/1/09 |
| 0 814 361 A1 | 10/1997 | (EP) | G02F/1/09 |
| 0 965 867 A1 | 12/1999 | (EP) | G02B/6/26 |
| 2 264 181 | 8/1993 | (GB) | G02F/1/09 |
| 5-215990 * | 8/1993 | (JP) . | |
| 08094969 | 4/1996 | (JP) | G02B/27/28 |
| 10-339849 * | 12/1998 | (JP) . | |
| WO 94/09400 | 4/1994 | (WO) | G02F/1/09 |
| WO 96/19743 | 6/1996 | (WO) | G02B/6/26 |
| WO 97/22034 | 6/1997 | (WO) | G02B/27/28 |
| WO 98 23983 | 6/1998 | (WO) | G02B/1/09 |

* cited by examiner

*Primary Examiner*—Cassandra Spyrou
*Assistant Examiner*—John Juba, Jr.
(74) *Attorney, Agent, or Firm*—Wilson Sonsini Goodrich & Rosati; David J. Abraham

(57) ABSTRACT

Disclosed are optical circulators possessing a longitudinal axis, the optical circulator including a first and second walk-off crystals optically coupled in a substantially equivalent optical distance, cascaded walk-off configuration, together with systems including such circulators, and methods of circulating optical signals.

29 Claims, 12 Drawing Sheets

U.S. PATENT DOCUMENTS

| | | | |
|---|---|---|---|
| 5,272,560 | 12/1993 | Baney et al. | 359/249 |
| 5,303,314 | 4/1994 | Duling, III et al. | 385/11 |
| 5,319,483 | 6/1994 | Krasinski et al. | 359/113 |
| 5,471,340 | 11/1995 | Cheng et al. | 359/281 |
| 5,546,219 | 8/1996 | Iida | 359/281 |
| 5,557,692 | 9/1996 | Pan et al. | 385/11 |
| 5,559,633 | 9/1996 | Emkey | 359/484 |
| 5,566,259 | 10/1996 | Pan et al. | 385/11 |
| 5,574,595 | 11/1996 | Kurata et al. | 359/484 |
| 5,574,596 | 11/1996 | Cheng | 359/484 |
| 5,682,446 | 10/1997 | Pan et al. | 385/11 |
| 5,689,367 | 11/1997 | Pan et al. | 359/495 |
| 5,689,593 | 11/1997 | Pan et al. | 385/11 |
| 5,706,371 | 1/1998 | Pan | 385/11 |
| 5,729,377 | 3/1998 | Bergmann | 359/249 |
| 5,734,763 | 3/1998 | Chang | 385/11 |
| 5,740,288 | 4/1998 | Pan | 385/11 |
| 5,818,981 | 10/1998 | Pan et al. | 385/11 |
| 5,850,493 | 12/1998 | Cheng | 385/34 |
| 5,930,039 | 7/1999 | Li et al. | 359/484 |
| 5,941,076 | 8/1999 | Sandelis | 60/752 |
| 5,956,441 | 9/1999 | Fairchild et al. | 385/27 |
| 5,982,539 | 11/1999 | Shirasaki | 359/484 |
| 6,011,649 * | 1/2000 | Chang | 359/484 |
| 6,014,244 | 1/2000 | Chang | 359/281 |
| 6,026,202 * | 2/2000 | Chang | 259/497 |
| 6,049,426 | 4/2000 | Xie et al. | 359/484 |
| 6,088,491 * | 7/2000 | Sorin et al. | 259/494 |

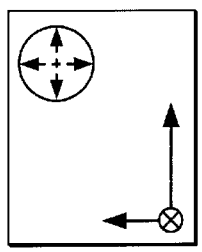 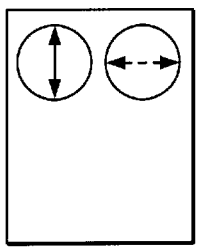 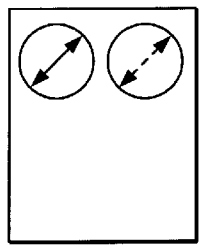 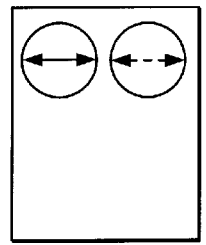
Z0　　　　　Z1　　　　　Z2　　　　　Z3
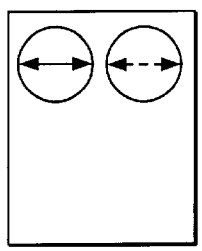 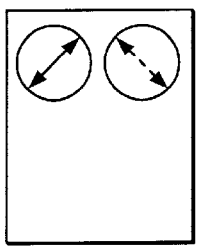 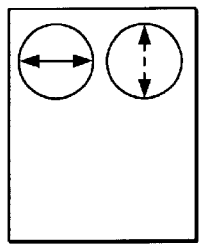 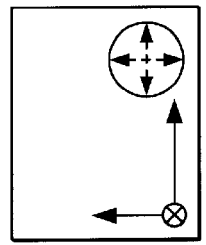
Z4　　　　　Z5　　　　　Z6　　　　　Z7
FIG. 4A
(PRIOR ART)
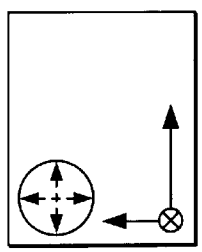 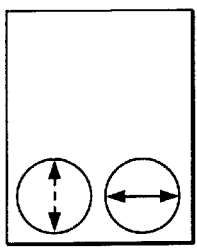 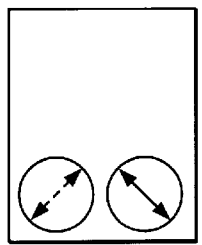 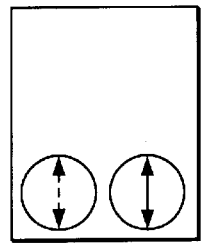
Z0　　　　　Z1　　　　　Z2　　　　　Z3
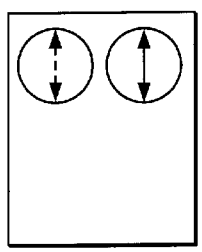 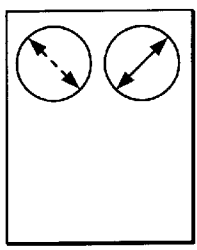 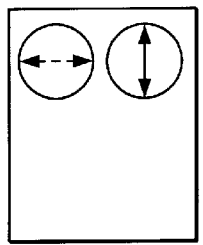 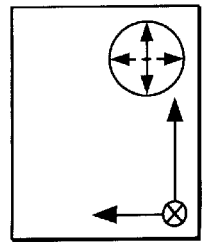
Z4　　　　　Z5　　　　　Z6　　　　　Z7
FIG. 4B
(PRIOR ART)

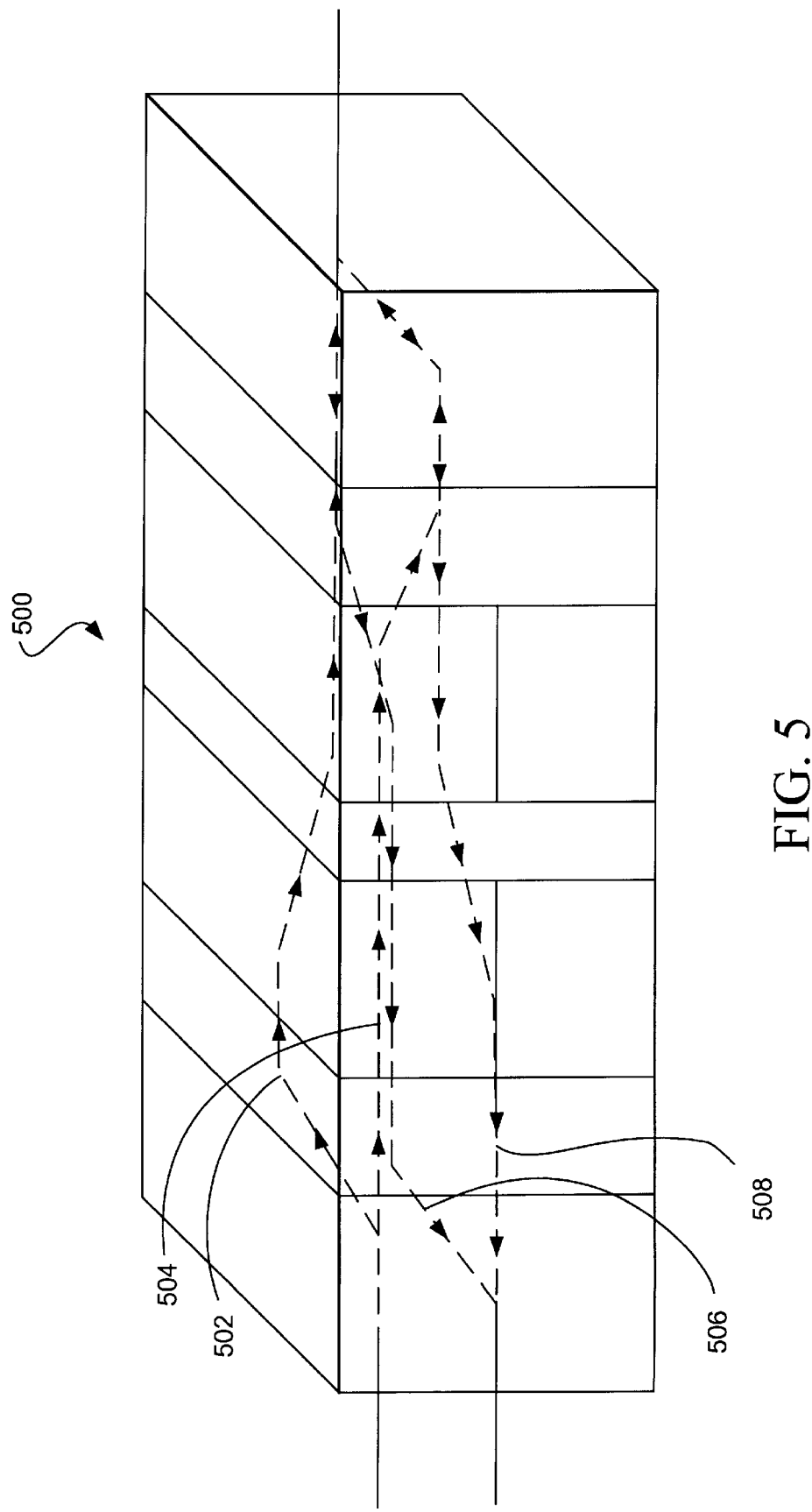

A-A 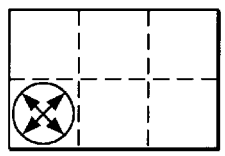 B-B 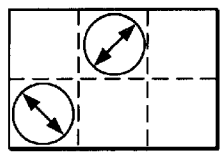 C-C 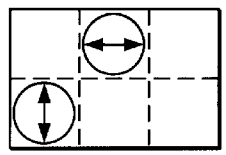 D-D 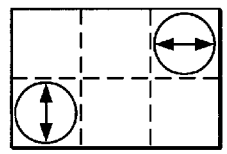
E-E 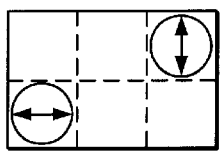 F-F 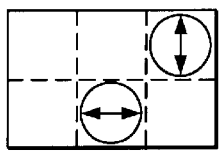 G-G 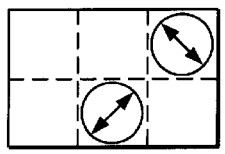 H-H 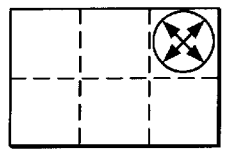
FIG. 11A
H-H 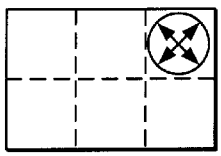 G-G 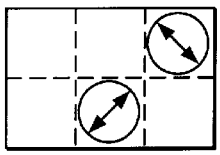 F-F 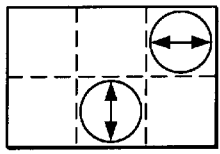 E-E 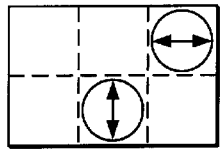
D-D 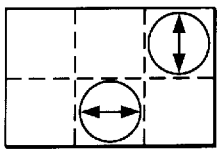 C-C 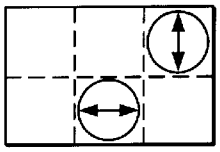 B-B 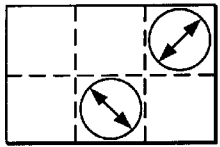 A-A 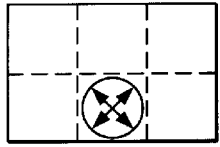
FIG. 11B

COMPACT POLARIZATION INSENSITIVE CIRCULATORS WITH SIMPLIFIED STRUCTURE AND LOW POLARIZATION MODE DISPERSION

CROSS-REFERENCE TO RELATED APPLICATIONS

This application claims the benefit of priority under 35 U.S.C. §119(e) to U.S. patent application Ser. No. 60/108,214, filed Nov. 13, 1998, by Xie et al.

BACKGROUND OF THE INVENTION

1. Field of the Invention

The invention relates to optical devices; more particularly, it relates to optical circulators.

2. Description of Related Art

An optical circulator is a nonreciprocal, typically three-port or four-port, device. Light entering the first port passes out the second port, but light entering the second port can not pass back to first port. Instead, it passes out of the third port. By installing an optical circulator at each end of a fiber link, an existing unidirectional fiber optic communication link can be quickly and economically converted to a bi-directional one. Such a modification results in a doubled bit carrying capacity. An optical circulator can also be used in applications such as wavelength division multiplexer (WDM), Erbium-doped fiber amplifier (EDFA), add-drop multiplexers, dispersion compensators and optical time domain reflectometers (OTDR's).

Optical circulators are a key element in today's optical networks. However, it has not been widely adopted because of its high cost. A typical optical circulator usually comprises many optical elements and has a large optical footprint. Manufacturing of conventional optical circulators usually requires precise alignment of each optical element, leading to low yields and high production costs.

An early concept of a polarization independent optical circulator for telecommunication use was disclosed in Matsumoto, U.S. Pat. No. 4,272,159. This document, and all others referred to herein, are incorporated by reference as if reproduced fully herein. Such circulators are widely used in conventional WDM optical networks.

Optical circulators have been described in patents, including the above-mentioned Matsumoto, U.S. Pat. No. 4,272,159; Emkey, U.S. Pat. No. 4,464,022; and Kuwahara, and U.S. Pat. No. 4,650,289. However, these early optical circulators often suffer from high insertion loss and/or crosstalk that is unacceptably high for many communications applications. Insertion loss is defined as the difference between the power between light launched into the optical circulator and the power that exits the device. Insertion loss is largely due to coupling loss from fiber to fiber, absorption of light and to imperfect polarization separation. Cross-talk in an optical circulator refers to the amount of power emitted at port 3 (to the receiver) from light entering at port 1 (from the transmitter). The conventional polarizing cubes used in these prior optical circulators often cause large insertion loss and cross-talk because of its low polarization extinction ratio.

Recent circulators as described in Koga, U.S. Pat. No. 5,204,771; and U.S. Pat. No. 5,319,483 represent some improvement in either insertion loss or cross talk. The optical circulators of Koga involve a beam path determining means for introducing a beam to a different direction depending upon the direction of the electric field vector and the propagation. In the context of the Koga circulators, the different direction being referred to is really an example of beam shifting, rather than a change in propagation direction. The beam path determining means of Koga shifts a beam such that it possesses the same propagation direction, but is spatially located in a different portion of the circulator. In this sense, the input beam to and output beam from the beam path determining means are parallel in propagation direction but are shifted in spatial location. A disadvantage of the Koga circulators is that the construction of these circulators demands precise fabrication of birefringent crystals and precise matching waveplates. These types of circulators are therefore often difficult and costly to make. The size of these circulators is also excessively large.

Recent circulators disclosed in Cheng, U.S. Pat. No. 5,471,340; and Cheng, U.S. Pat. No. 5,574,596, appear to have low insertion loss and cross talk, and also to have a simplified structure compared to previous circulators. The Cheng patents disclose the use of beam path determining means of several long birefringent crystals to replace conventional polarizing cubes. The beam path determining means serve to shift the beams passing through, rather than changing the propagation direction. A disadvantage of the Cheng circulators is that long birefringent crystals are often difficult to fabricate. They are also quite expensive. Furthermore, the footprint of this type of circulator is more bulky than other circulators.

Another, fairly serious, drawback of the Cheng circulators is that polarization mode dispersion ("PMD") in the circulators is not eliminated unless additional compensation crystals are introduced. Such additional crystals add significant cost and complexity. Polarization mode dispersion is introduced in an optical component when signal energy at a given wavelength is resolved into two orthogonal polarization modes of slightly different propagation velocity or optical path. The resulting difference in propagation time between polarization modes is called differential group delay or PMD. PMD causes a number of serious capacity impairments, including pulse broadening. In addition, alignment of this type of circulators depends on sub-micron precision positioning of single mode fibers. Therefore, manufacturing of the PMD corrected Cheng circulators is non-trivial.

Pan, U.S. Pat. No. 5,689,593, describes another type of circulator that uses several polarization beam splitting prisms to arrange all optical ports on one side and eliminate polarization mode dispersion. This design has the convenience of having all optical ports on one side. Additionally, polarization mode dispersion is eliminated by symmetry of the optical path. However this design uses several polarization beam splitter cubes, making it very bulky and expensive.

Given the above-mentioned problems with prior art optical circulators, there is a need for a simplified optical circulator comprised of simple optical elements with reduced polarization mode dispersion that is suitable for volume manufacturing.

SUMMARY OF THE INVENTION

In one aspect, the invention relates to an optical circulator possessing a longitudinal axis, the optical circulator comprising first and second walk-off crystals optically coupled in a substantially equivalent optical distance, cascaded walk-off configuration.

In another aspect, the invention relates to an optical circulator having a longitudinal axis comprising a first beam displacer/combiner that displaces at least one optical beam into two polarized component beams and combines at least two polarized component beams to form an optical beam; a first nonreciprocal rotator, optically coupled to the first beam displacer/combiner distally along the longitudinal axis, for rotating the polarization orientation of the polarized component beams; a first walk-off crystal, optically coupled to the first nonreciprocal rotator distally along the longitudinal axis, for walking-off only one of the polarized component beams; a second walk-off crystal, optically coupled to the first walk-off crystal distally along the longitudinal axis, for walking-off the other polarized component beams; a reciprocal rotator, optically coupled distally from the first walk-off crystal and proximally from the second walk-off crystal; a second nonreciprocal rotator, optically coupled to the second walk-off crystal distally along the longitudinal axis, for rotating the polarization orientation of the polarized component beams; and a second beam displacer/combiner, optically coupled to the second nonreciprocal rotator distally along the longitudinal axis, that displaces at least one optical beam into two polarized component beams and combines at least two polarized component beams to form an optical beam.

In still another aspect, the invention relates to a method of circulating optical signals comprising optically coupling a first and second walk-off crystal in a substantially equivalent optical distance, cascaded walk-off, configuration.

BRIEF DESCRIPTION OF THE DRAWINGS

FIGS. 4A–4B show cross-sectional views of the prior art circulator shown in FIG. 3.

FIG. 5 shows a side isometric view of a circulator according to the invention.

FIGS. 11A–11B show cross-sectional views of the circulator shown in FIG. 10.

DETAILED DESCRIPTION OF THE INVENTION

Figure 1:
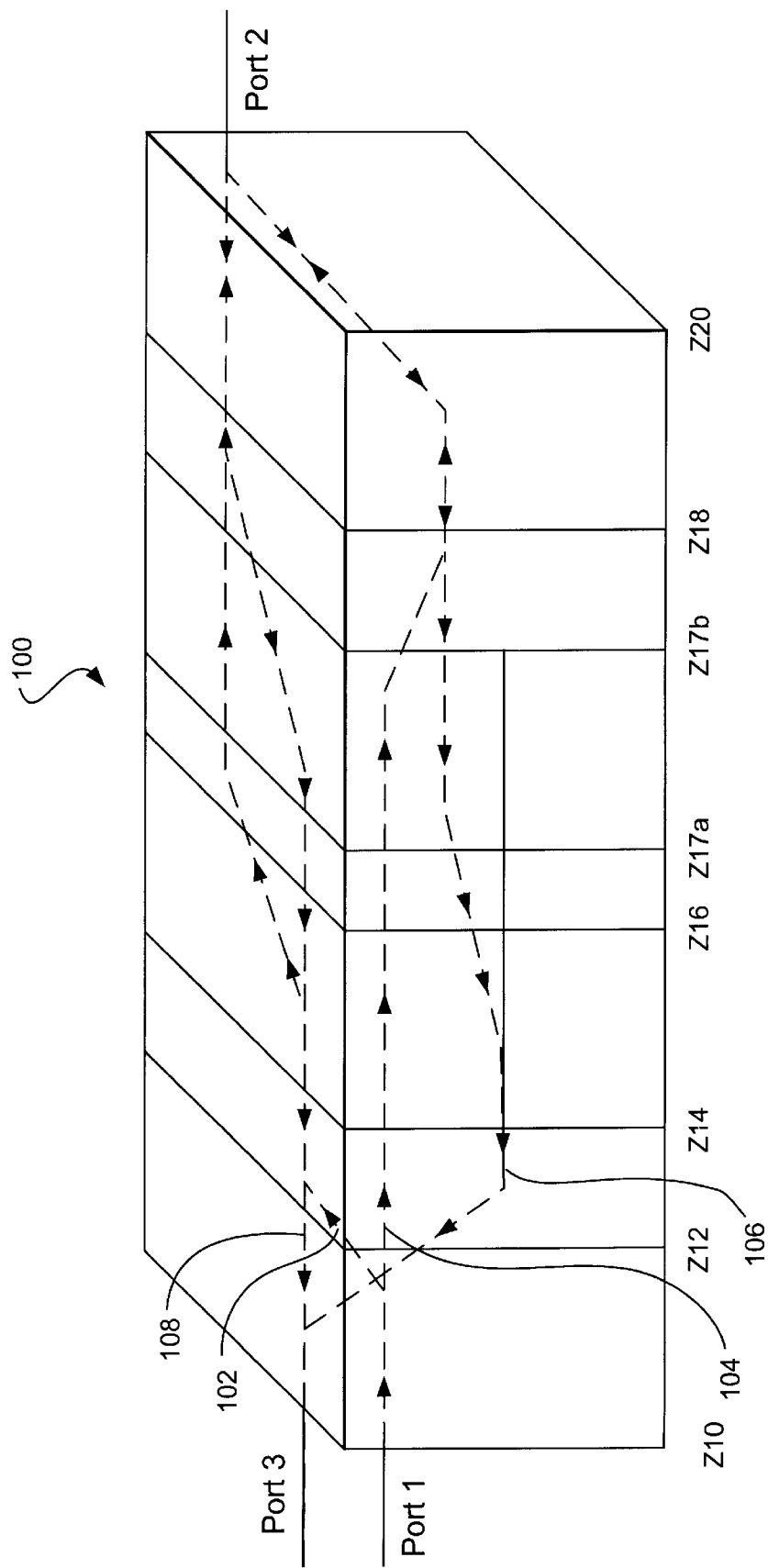
FIG. 1 shows a side isometric view of a prior art circulator.

FIG. 1 illustrates conventional optical circulator 100, together with ray traces of optical signals 102, 104, 106, and 108. Optical signals may be displaced, based on their polarization, from the propagation direction they possessed upon their entry into circulator 100. Optical signals 102 and 104 travel from a first optical port to a second optical port along different beampaths. Similarly, optical signals 106 and 108 travel from the second optical port to a third optical port along different beampaths (the first and third optical ports are located on the same side of optical circulator 100). It is possible to note upon inspection of the two pairs of optical signals and their beam paths that at least one of the pairs of optical signals are not substantially equivalent in the optical distance traveled by the optical signals. For example, the beampaths of optical signals 106 and 108 are not substantially equivalent in their optical distance.

The result of the signals not being substantially equivalent in their optical distance travelled may be polarization mode dispersion or PMD. PMD is a loss of sharpness of an optical signal, resulting in poorer signal to noise ratios. PMD is introduced in an optical component when signal energy at a given wavelength is resolved into two orthogonal polarization modes of slightly different propagation velocity or optical path. The resulting difference in propagation time between polarization modes is also called differential group delay. PMD causes a number of serious capacity impairments, including pulse broadening.

Optical circulator 100 is also not configured in a cascaded walk-off configuration. As an optical signal propagates from a first optical port of a circulator to a second optical port, and then as a signal propagates from the second port to a third optical port, a circulating optical beam path is described. A cascaded walk-off configuration may be defined as a series of walk-offs of a polarized component optical beam propagating along the circulating optical beam path, other than the walk-offs associated with beam displacer/combiners, wherein more than one of the walk-offs of both of a pair of polarized component optical beams are in substantially the same direction.

Figure 2A:
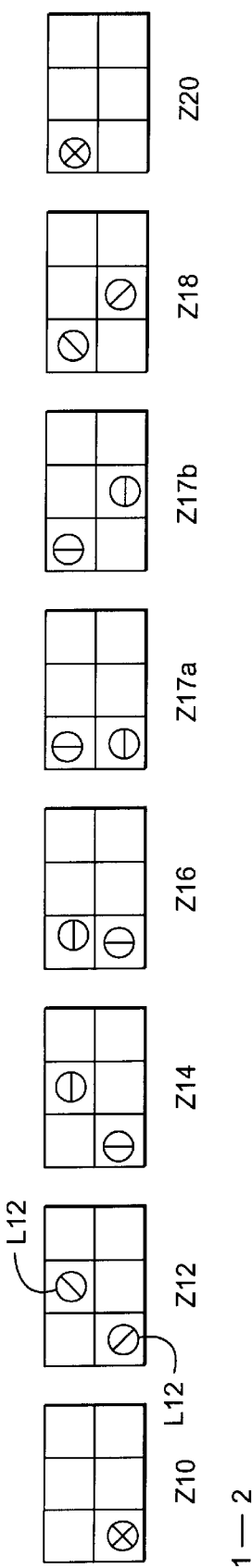
FIGS. 2A–2B show cross-sectional views of the prior art circulator shown in FIG. 1.
Figure 2B:
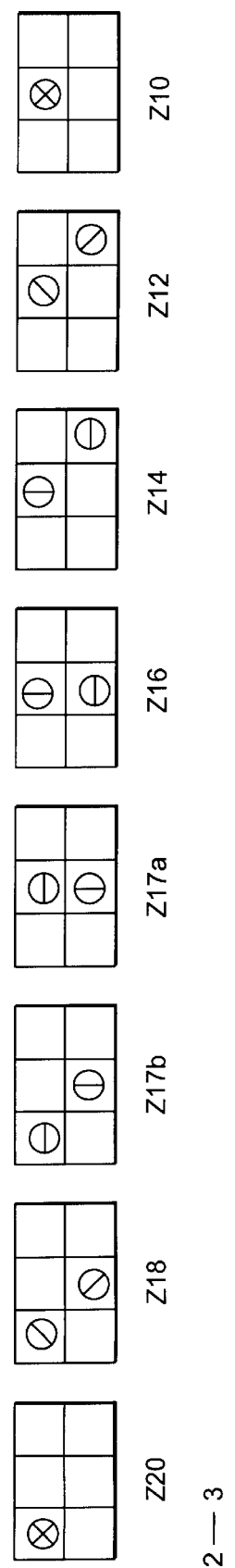

For example, the walk-offs of the pair of polarization component beams depicted in FIGS. 2A–B are not in a cascaded configuration. In FIG. 2A, the top polarization component is walked-off one box to the left. In FIG. 2B, the top component is walked-off one box to the left, resulting in no net walk-off. The bottom component, in contrast, is walked-off one box to the right, as is shown in FIG. 2A, and is walked off to the right again, as shown in FIG. 2B. There is therefore a net walk-off of the bottom, but not the top, polarization component optical beam in the pair of beams propagating through the circulator.

In a preferable embodiment, the number of walk-offs in substantially the same direction incurred by a polarization component optical beam propagating along the circulating beam path comprises two or more walk-offs, more preferably three or more walk-offs.

An advantage of a cascaded walk-off configuration is that it facilitates use of shorter walk-off crystals and/or beam combiner/displacers. Typical walk-off crystals, such as Rutile or $YVO_4$, exhibit a ratio of walk-off distance to crystal length of 1:10. For example, for a given optical port separation d, defined as the distance between the first and third optical ports in a typical circulator configuration, the longest walk-off crystal or beam displacer/combiner must be approximately 10d, i.e. approximately ten times the distance between the first and third optical ports. This distance is required as a result of the walk-off configuration of optical circulator 100, in which the walk-offs are not cascaded. Accordingly, at least one very long walk-off crystal or beam combiner/displacer must be used. Such crystals or beam combiner/displacers are relatively very expensive, and account for a significant portion of the overall cost of optical circulator 100.

Figure 3:
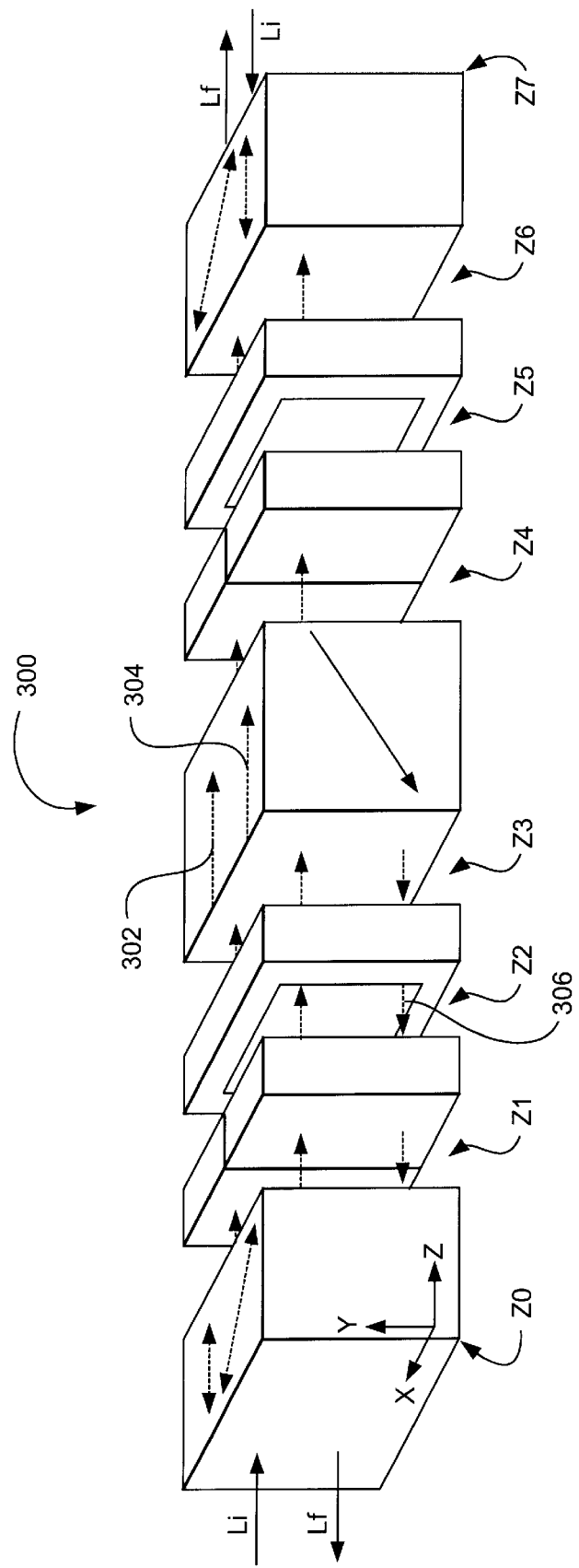
FIG. 3 shows a side isometric view of another prior art circulator.

FIG. 3 shows conventional optical circulator 300, with pairs of optical signals 302 and 304, 306, and 308 (not shown). Unlike optical circulator 100, the optical distance traveled of optical signals 302, 304, 306 and 308 are substantially equivalent. In fact, they are substantially symmetrical. Therefore, optical circulator 300 may not exhibit PMD due to differences in signal optical distance traveled.

However, optical circulator 300 is not configured in a cascaded walk-off configuration. This may be seen in FIGS. 4A–B. As the polarization component beams propagate from Z0 to Z7, the beams undergo no walk-offs, other than is involved in beam combining and displacing. In travelling from Z7 to Z0, the beams undergo only one walk-off; one box in the downward direction. Optical circulator 300 is therefore not configured in a cascaded walk-off configuration, because the pairs of polarization component beams undergo only one walk-off along the same direction as they propagate along the circulating beam path.

Therefore, to achieve a first and third optical port separation of d, the longest walk-off crystal must be 10d. Once again, the use of relatively long walk-off crystals will contribute to a relatively high cost for optical circulator 300.

Referring now to FIG. 5, optical circulator 500 is an optical circulator according to the invention. Shown are pairs of optical beams 502 and 504, 506 and 508. The beam paths of pairs of optical beams 502 and 504, 506 and 508, are substantially equivalent in optical distance. In fact, they are a special case of substantial equivalence in optical distance in that they are symmetrical. In such case, and in contrast to optical circulator 100, operation of optical circulator 500 may be substantially PMD-free, with the benefits noted above.

Figure 7A:
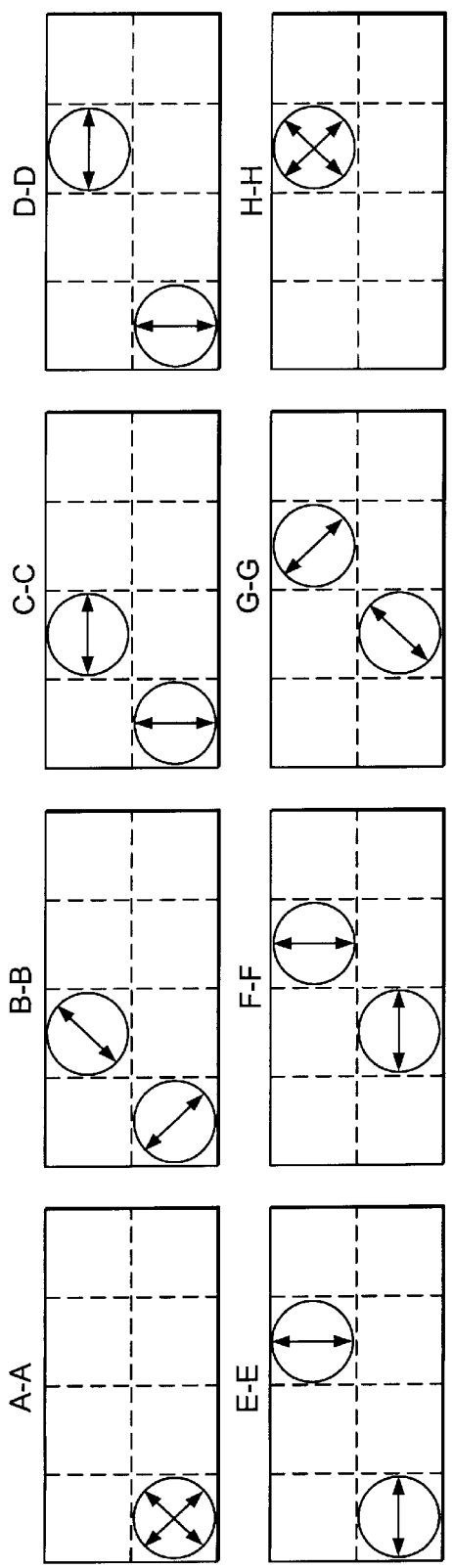
FIGS. 7A–7B show cross-sectional views of the circulator shown in FIG. 6.
Figure 7B:
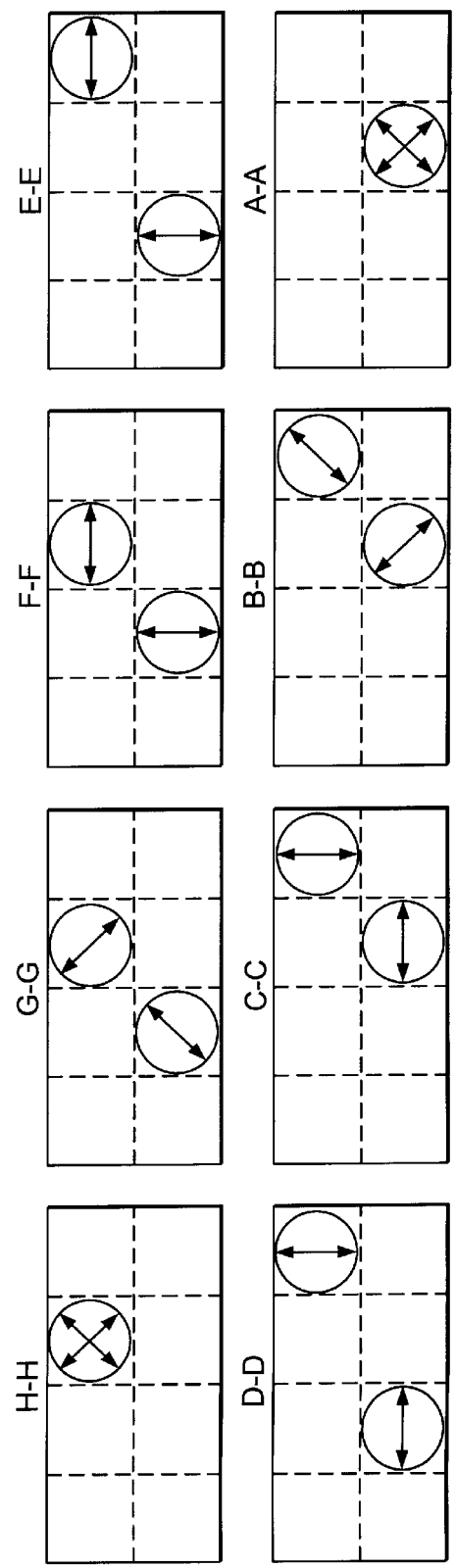

Further, optical circulator 500 is configured in a cascaded walk-off configuration. This may be more easily seen by inspection of FIGS. 7A–B, which show cross-sections of optical circulator 500, which is identical in its arrangements of optical elements to optical circulator 300. As shown in FIG. 7A, the bottom polarization component optical beam is walked-off to the right, and is walked-off to the right again as shown in FIG. 7B. Further, the top polarization component optical beam is walked-off one box to the right as shown in FIG. 7A, and is walked-off another box to the right as shown in FIG. 7B. Therefore, optical circulator 500 possesses a series of walk-offs of polarized component optical beam propagating along the circulating optical beam path, other than the walk-offs associated with beam displacer/combiners, wherein more than one of the walk-offs of both of a pair of polarized component optical beams are in substantially the same direction.

Accordingly, to achieve a port separation between the first and third optical ports of d, the longest walk-off crystal need only be 5d. This is only half of the length required by conventional circulators, such as optical circulator 100 or optical circulator 300. This represents a significant material cost savings for optical circulators according to the invention as compared with conventional circulators.

Figure 6:
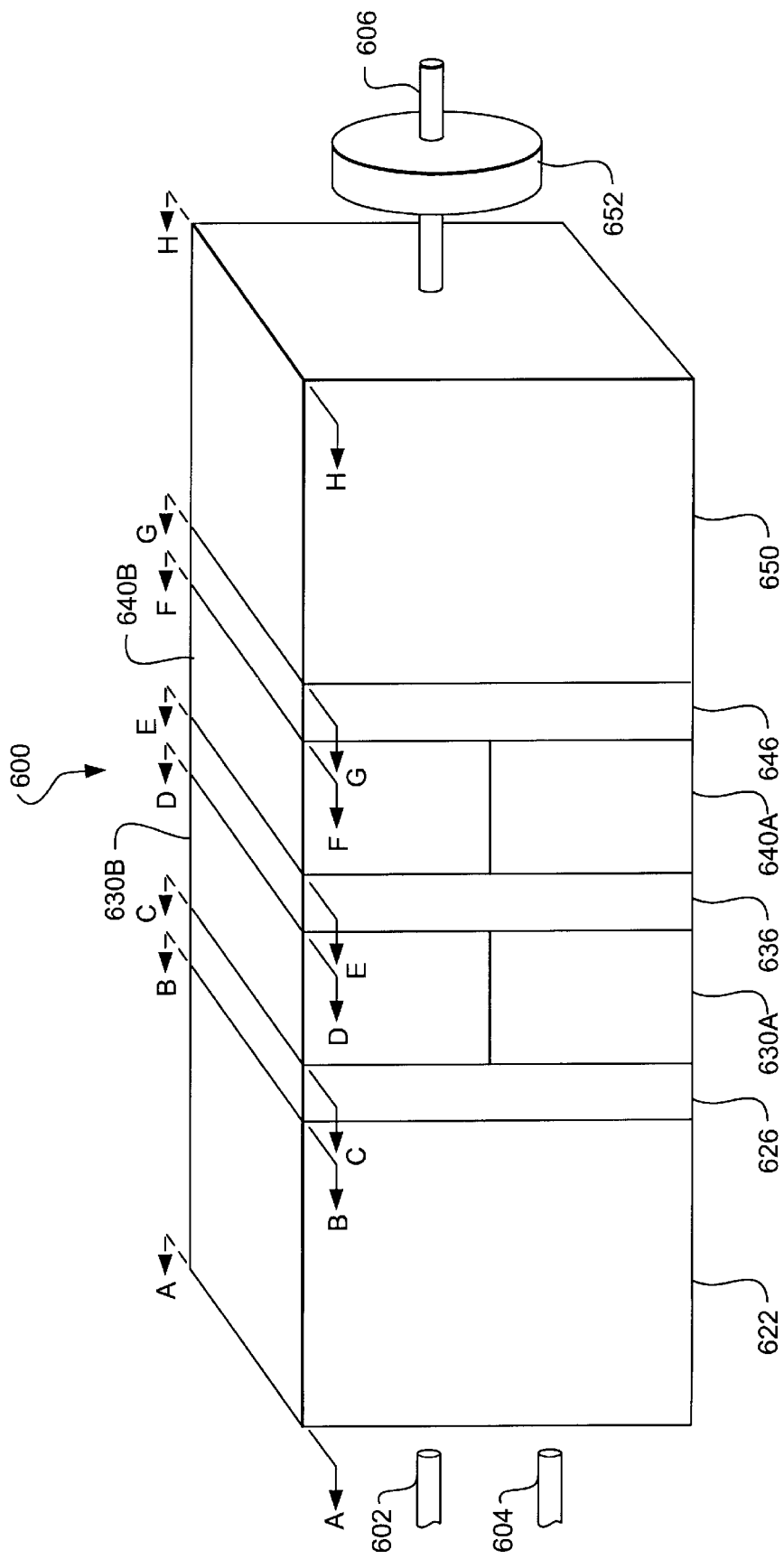
FIG. 6 shows a side isometric view of a circulator according to the invention.

FIG. 6 shows an isometric view of optical circulator 600, which is an embodiment according to the invention. The optical circulator includes first optical port 602, third optical port 604, second optical port 606, first beam displacer/combiner 622, first nonreciprocal rotator 626, first walk-off crystals 630A–B, reciprocal rotator 636, second walk-off crystals 640A–B, second nonreciprocal rotator 646, second beam displacer/combiner 650, and optional imaging element 652.

Optical circulator 600 possesses a longitudinal axis, along which the various optical components are distributed, and a proximal and distal end. First optical port 602, and third optical port 604 are located at a proximal end, and second optical port 606 is located at a distal end of the optical circulator.

In preferable embodiments, the first, second, and third optical ports may comprise integrated optical circuits or optical fibers. In a more preferable embodiment, the first, second, and third optical ports may comprise optical fibers wherein the optical fibers comprise conventional optical fibers or thermally expanded core (TEC) optical fibers. TEC fibers may be generally used in the optical circulators according to the invention to reduce alignment sensitivity and package size. Optional imaging element 652 may be located anywhere on the optical path between the first, second, or third optical port such that the first and third optical ports on the proximal side and the second optical port on the distal side are conjugate images of each other. In such an embodiment, the imaging element may be a collimating lens. In a more preferable embodiment, the imaging element may be a Grin lens. In such an embodiment, the Grin lens may be located at second optical port 606, as shown, or may be located between first walk-off crystals 630A–B and reciprocal rotator 636, or between second walk-off crystals 640A–B and reciprocal rotator 636. Alternatively, a single imaging element, such as a Grin lens, may be located between each optical port, and its respective beam combiner/displacer. In such an embodiment, one imaging element is optically coupled to each port of the optical circulator. First beam displacer/combiner 622 is optically coupled distally to the first and third optical ports. In a preferable embodiment, the first beam displacer/combiner is a birefringent crystal. In a more preferable embodiment, the first beam displacer/combiner comprises Yttrium Orthovanadate, calcite, rutile or alpha-BBO. First nonreciprocal rotator 626 comprises a Non-reciprocal Faraday polarization rotator and is optically coupled distally from the first beam displacer/combiner. In a preferable embodiment, the first nonreciprocal rotator comprises yttrium-iron-garnet (YIG), or Bi-added thick film crystals. In a more preferable embodiment, the Bi-added thick film crystals comprise a combination of, for example, $(YbTbBi)_3Fe_5O_{12}$ and $(GdBi)_3(FeAlGa)_5O_{12}$, or of YIG and $Y_{3-x}Bi_xFe_5O_{12}$. First walk-off crystals 630A–B are optically coupled to one another and are coupled distally from the first nonreciprocal rotator. In a preferable embodiment, the first walk-off crystals comprise $YVO_4$, calcite, rutile, or alpha-BBO. Walk-off crystals according to the invention preferably may comprise a pair of birefringent crystals. Reciprocal rotator 636 is optically coupled distally from the first walk-off crystals. In a preferable embodiment, the reciprocal rotator comprises a reciprocal rotator plate. In a more preferable embodiment, the reciprocal rotator comprises a low order half-wave plate. In a still more preferable embodiment, the reciprocal rotator comprises a zeroeth order half-wave plate. Second walk-off crystals 640A–B are optically coupled to one another and are coupled distally from the reciprocal rotator. In a preferable embodiment, the second walk-off crystals comprise $YVO_4$, calcite, rutile, or alpha-BBO. Walk-off crystals according to the invention preferably may comprise a pair of birefringent crystals. Second nonreciprocal rotator 646 comprises a Non-reciprocal Faraday polarization rotator and is optically coupled distally from the second walk-off crystals. In a preferable embodiment, the second nonreciprocal rotator comprises yttrium-iron-garnet (YIG), or Bi-added thick film crystals. In a more preferable embodiment, the Bi-added thick film crystals comprise a combination of, for example, $(YbTbBi)_3Fe_5O_{12}$ and $(GdBi)_3(FeAlGa)_5O_{12}$, or of Y.I.G. and $Y_{3-x}Bi_xFe_5O_{12}$. Second beam displacer/combiner 650 is optically coupled distally from the second nonreciprocal rotator and proximally from the second optical port.

In operation, arbitrarily polarized light exits first optical port 602 and enters first beam displacer/combiner 622, which acts as a polarization sensitive beam displacement plate. The arbitrarily polarized light is decomposed into two orthogonal polarization components. Within the first beam displacer/combiner, the first component is an ordinary light ray (O-ray) and the other component is an extraordinary light ray (E-ray). The E-ray walks off diagonally from the O-ray through the first beam displacer/combiner, with the result that there is a top and bottom component. As the two light components enter first nonreciprocal rotator 626, their polarization is rotated clockwise 45 degrees while their polarization orientations remain orthogonal to each other. As the light rays enter first walk-off crystals 630A–B, the top polarization component enters first walk-off crystal 630B, and is walked off horizontally away from the bottom component, towards the right side of the circulator cross-section. The bottom component enters first walk-off crystal 630A with no walk-off effect occurring.

The light rays next go through reciprocal rotator 636, and both polarization components are rotated 90 degrees. The top component then enters second walk-off crystal 640B without being walked-off. The bottom component enters second walk-off crystal 640A as an E-ray and is walked off horizontally in the same direction as the walk-off effect produced by first walk-off crystal 630A. As the two polarization components travel through second nonreciprocal rotator 646, their polarization orientation will be rotated 45 degrees counter-clockwise.

The clockwise/counter-clockwise nature of the first and second nonreciprocal rotators may be reversed if desired, such that the first nonreciprocal rotator rotates light 45 degrees counter-clockwise and the second nonreciprocal rotator rotates light 45 degrees clockwise. Second beam displacer/combiner 650 serves to recombine the two components, with the recombined light emerging and being imaged at second optical port 606. Arbitrarily polarized light entering second optical port 606 will travel in the opposite direction, and will exit at third optical port 604. This creates optical circulation.

The operation of the optical circulator embodiment shown in FIG. 6 is illustrated in the cross sectional schematic representations shown in FIGS. 7A–B. FIG. 7A shows how the two orthogonal components of arbitrarily polarized light entering at first optical port 602 are manipulated so as to arrive at second optical port 606. The two arbitrarily polarized orthogonal components are shown at cross section A—A, as they exit first optical port 602 and enter the first beam displacer/combiner. At cross-section B—B, upon exiting the first beam displacer/combiner, the top component is shown as being walked off diagonally from the bottom component. At cross-section C—C, upon exiting first nonreciprocal rotator 626, the polarization of both components is shown as being rotated by 45 degrees clockwise. At cross-section D—D, upon exiting the first walk-off crystals 630A–B, the top component is walked-off horizontally to the right side of the cross-section. At cross-section E—E, upon exiting reciprocal rotator 636, the polarization of the two components is shown rotated by 90 degrees. At cross-section F—F, upon exiting second walk-off crystals 640A–B, the bottom component is shown as being walked-off in the same direction as was the top component in cross-section B—B. At cross-section G—G, upon exiting second nonreciprocal rotator 646, the polarization of the components is rotated counter-clockwise by 45 degrees. At cross-section H—H, upon exiting second beam displacer/combiner 650, the two components are recombined to exit at second optical port 606.

FIG. 7B shows how the two orthogonal components of arbitrarily polarized light entering at second optical port 606 are manipulated so as to arrive at third optical port 604. The two arbitrarily polarized orthogonal components are shown at cross section H—H as they enter the second beam displacer/combiner. At cross-section G—G, the bottom component is shown as being walked off diagonally from the top component, thus creating a top and bottom component. At cross-section F—F, the polarization of both components is shown as being rotated by 45 degrees counter-clockwise. At cross-section E—E, the top component is shown as being walked off horizontally to the right of the circulator. At cross-section D—D, the polarization of the two components is rotated by 90 degrees. At cross-section C—C, the bottom component is shown as being walked-off in the same direction as was the top component in cross-section E—E. At cross-section B—B the polarization of the components is rotated clockwise by 45 degrees. At cross-section A—A, the two components are recombined to exit at third optical port 604.

It is worth noting that expansion of more optical ports is easily accommodated in this type of optical circulator construction by simply adding more fibers on each side. Optical ports are divided into left array and right array. For example, the left array of optical ports consists of equally spaced odd ports such as port 1, 3, 5 and 7. The right array of optical ports is also equally spaced and even-numbered ports such as port 2, 4, 6 and 8. The spacing in the left array (distance between 1 and 3) is the same as that of the right array (distance between 2 and 4) and is determined by the arrangement of the walk-off crystals and other optical elements.

Figure 8:
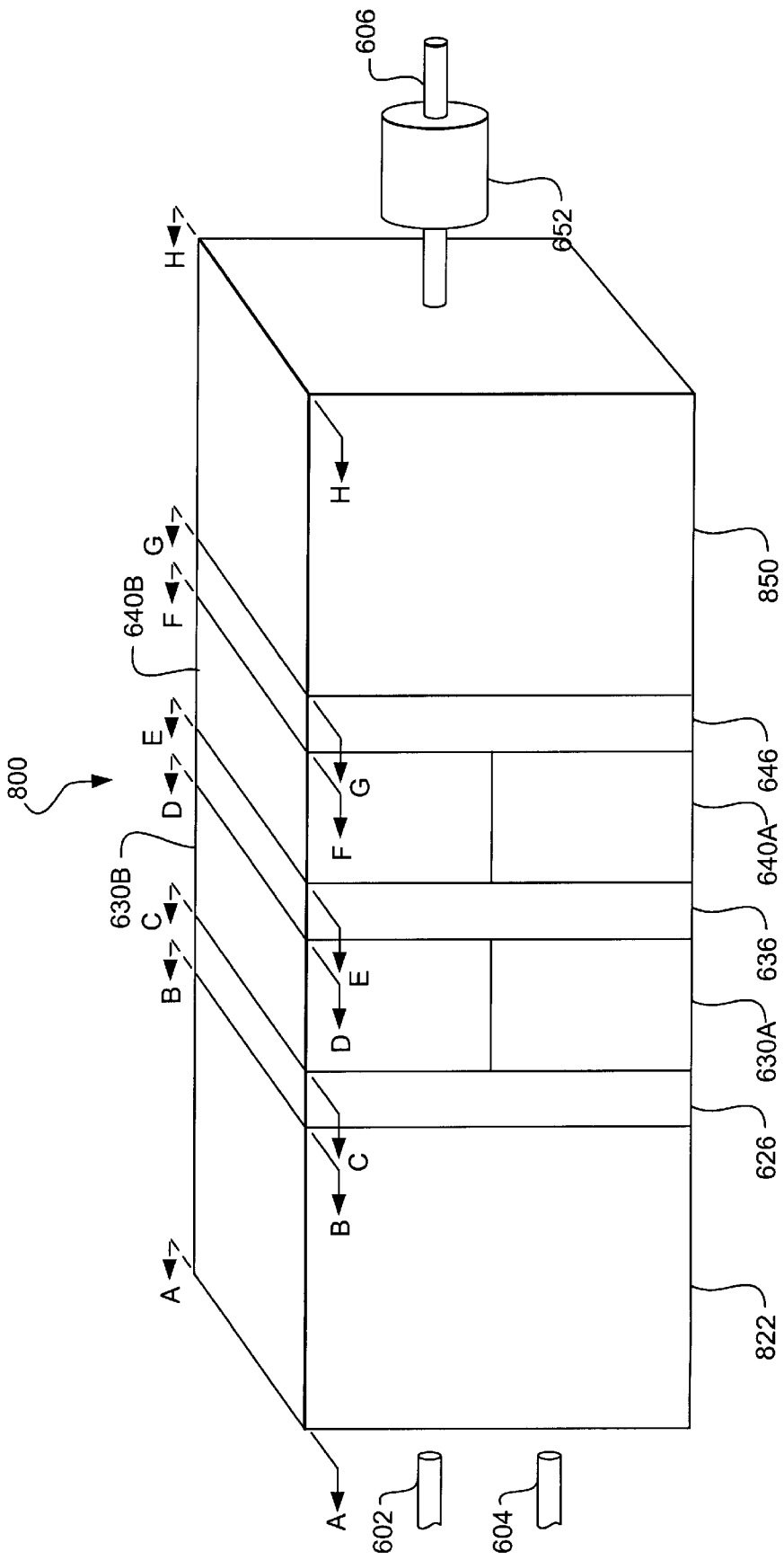
FIG. 8 shows a side isometric view of another circulator according to the invention.

FIG. 8 shows an isometric view of optical circulator according to the invention. Optical circulator 800 includes first optical port 602, third optical port 604, second optical port 606, first beam displacer/combiner 822, first nonreciprocal rotator 626, first walk-off crystals 630A–B, reciprocal rotator 636, second walk-off crystals 640A–B, second nonreciprocal rotator 646, second beam displacer/combiner 850, and optional imaging element 652.

Optical circulator 800 is structurally organized identically to optical circulator 600 shown in FIG. 6, with the exception that the orientation of the first and second beam displacer/combiners have been changed by 45 degrees. In optical circulator 800, the walk-off direction of first beam displacer/combiner 822 and second beam displacer/combiner 850 are in the vertical direction. This differs from the walk-off direction of the first and second beam displacer/combiners 622 and 650 in optical circulator 600, which were at an angle of 45 degrees from the vertical direction.

In operation, arbitrarily polarized light exits first optical port 602 and enters first beam displacer/combiner 822, which acts as a polarization sensitive beam displacement plate. The arbitrarily polarized light is decomposed into two orthogonal polarization components. Within the first beam displacer/combiner, the E-ray walks off vertically from the O-ray, with the result that there is a top and bottom component. As the two light components enter first nonreciprocal rotator 626, their polarization is rotated clockwise 45 degrees while their polarization orientations remain orthogonal to each other. As the light rays enter first walk-off crystals 630A–B, the top polarization component enters first walk-off crystal 630B, and is walked off vertically away from the bottom component, towards the top of the circulator cross-section. The bottom component enters first walk-off crystal 630A and is walked off vertically away from the top component, towards the bottom of the circulator cross-section.

The light rays next go through reciprocal rotator 636, and both polarization components are rotated 90 degrees. The light rays then enter second walk-off crystals 640A–B. The top polarization component enters second walk-off crystal 640A, and is walked off vertically towards the bottom component, in a downward direction. The bottom component enters second walk-off crystal 640B and is walked off vertically towards from the top component, in an upward direction. As the two polarization components travel through second nonreciprocal rotator 646, their polarization orientation will be rotated 45 degrees counter-clockwise. The clockwise/counter-clockwise nature of the first and second nonreciprocal rotators may be reversed if desired, such that the first nonreciprocal rotator rotates light 45 degrees counter-clockwise and the second nonreciprocal rotator rotates light 45 degrees clockwise. Second beam displacer/combiner 850 serves to recombine the two components, with the recombined light emerging and being imaged at second optical port 606. Arbitrarily polarized light entering second optical port 606 will travel in the opposite direction, and will exit at third optical port 604. This creates optical circulation.

Figure 9A:
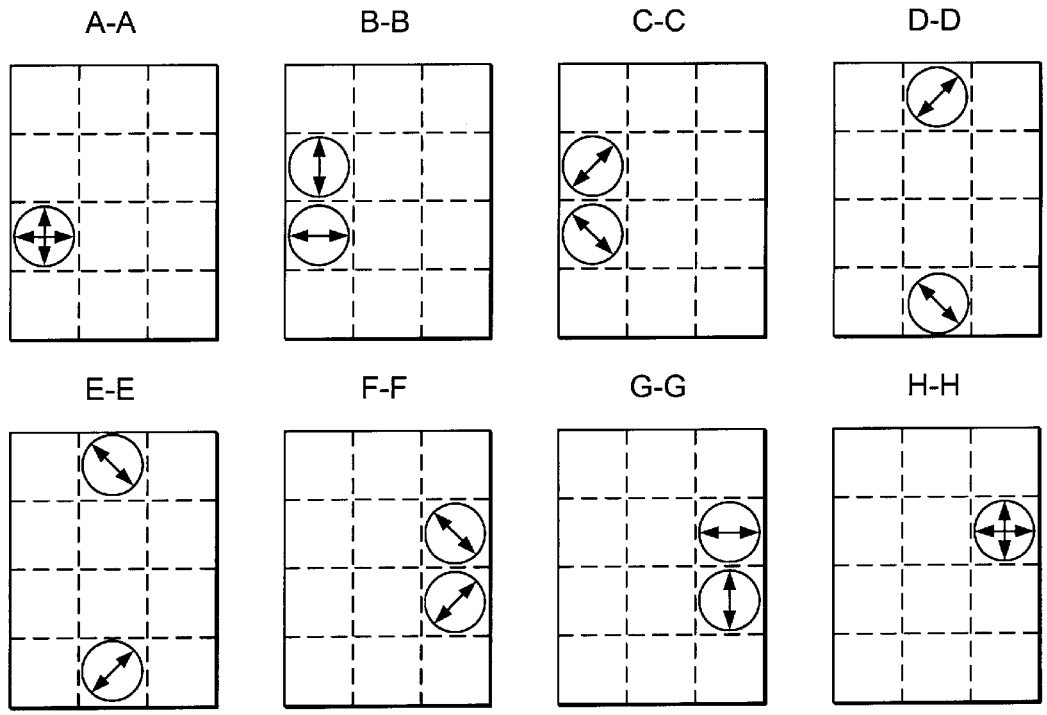
FIGS. 9A–9B show cross-sectional views of the circulator shown in FIG. 8.
Figure 9B:
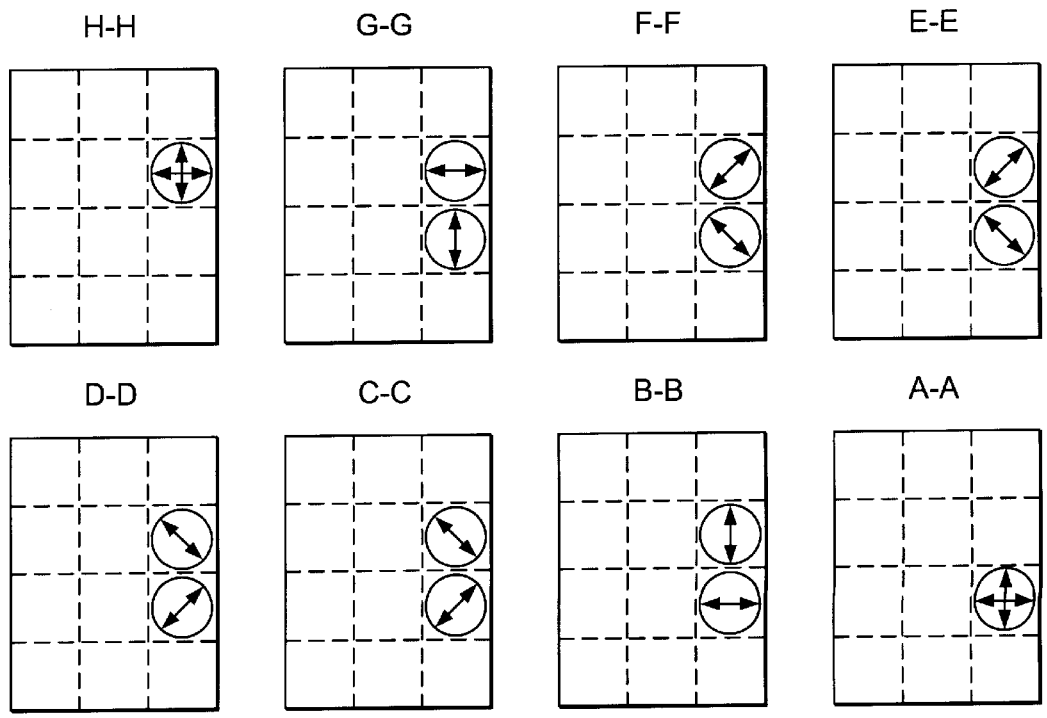

The operation of the optical circulator embodiment shown in FIG. 8 is illustrated in the cross sectional schematic representations shown in FIGS. 9A–B. FIG. 9A shows how the two orthogonal components of arbitrarily polarized light entering at first optical port 602 are manipulated so as to arrive at second optical port 606. The two arbitrarily polarized orthogonal components are shown at cross section A—A, as they exit first optical port 602 and enter the first beam displacer/combiner. At cross-section B—B, upon exiting the first beam displacer/combiner, the top component is shown as being walked off vertically from the bottom component. At cross-section C—C, upon exiting first nonreciprocal rotator 626, the polarization of both components is shown as being rotated by 45 degrees clockwise. At cross-section D—D, upon exiting the first walk-off crystals 630A–B, the top and bottom components are walked-off vertically away from one another. At cross-section E—E, upon exiting reciprocal rotator 636, the polarization of the two components is shown rotated by 90 degrees. At cross-section F—F, upon exiting second walk-off crystals 640A–B, the top and bottom components are shown as being walked-off vertically towards one another. At cross-section G—G, upon exiting second nonreciprocal rotator 646, the polarization of the components is rotated counter-clockwise by 45 degrees. At cross-section H—H, upon exiting second beam displacer/combiner 850, the two components are recombined to exit at second optical port 606.

FIG. 9B shows how the two orthogonal components of arbitrarily polarized light entering at second optical port 606 are manipulated so as to arrive at third optical port 604. The two arbitrarily polarized orthogonal components are shown at cross section H—H as they enter the second beam displacer/combiner. At cross-section G—G, the bottom component is shown as being walked off vertically downwards from the top component, thus creating a top and bottom component. At cross-section F—F, the polarization of both components is shown as being rotated by 45 degrees counter-clockwise. At cross-section E—E, both the components remain unchanged. At cross-section D—D, the polarization of the two components is rotated by 90 degrees. At cross-section C—C, both the components remain unchanged. At cross-section B—B, the polarization of the components is rotated clockwise by 45 degrees. At cross-section A—A, the two components are recombined to exit at third optical port 604.

Figure 10:
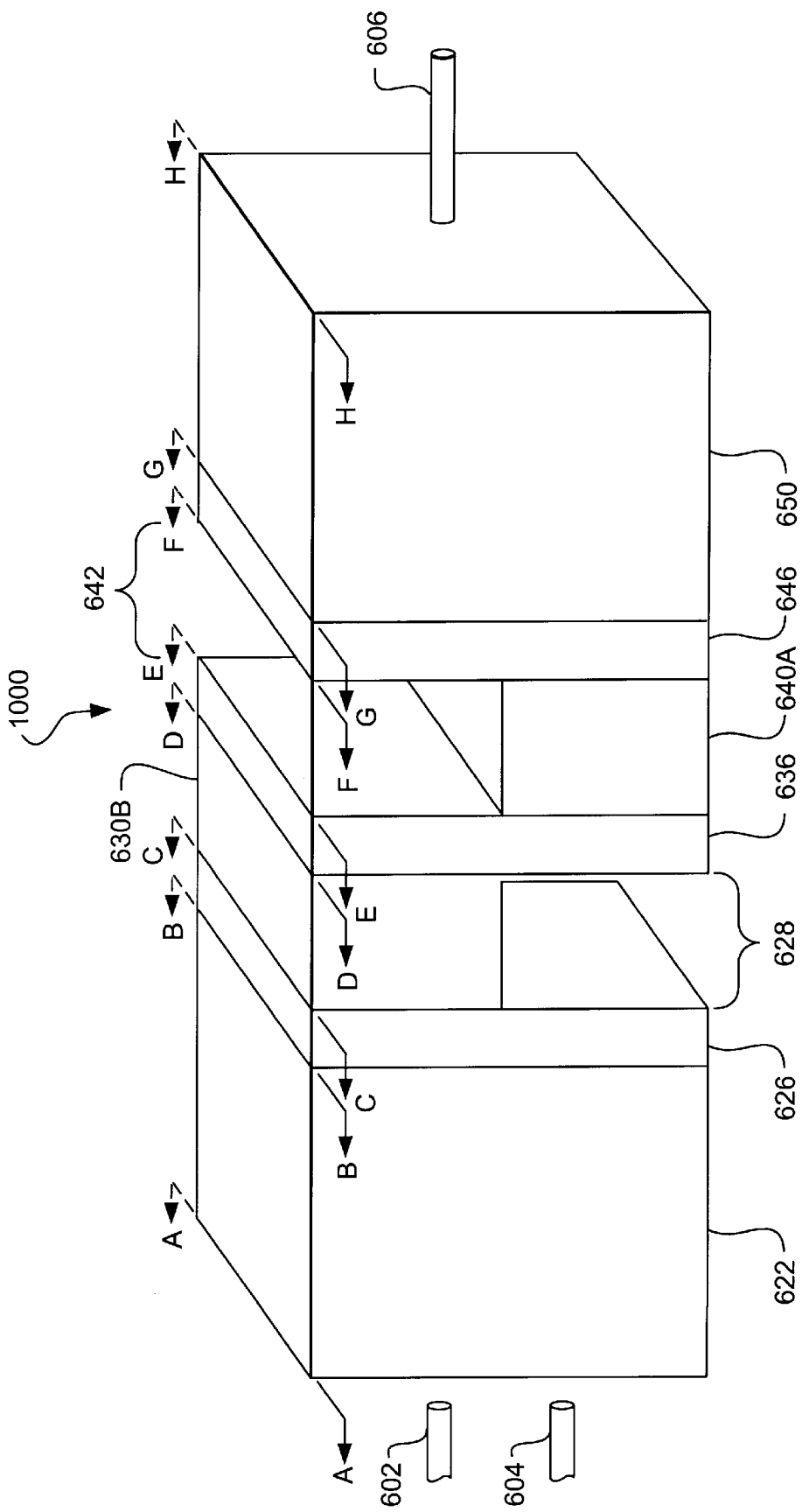
FIG. 10 shows a side isometric view of another circulator according to the invention.

FIG. 10 shows an isometric view of optical circulator 1000 according to the invention. The design of optical circulator 1000 offers several advantages over prior art designs. These include a substantially PMD-free design, and use of only seven crystals for a two-stage circulator, which is a substantial reduction over the prior art. The optical circulator includes first optical port 602, third optical port 604, second optical port 606, first beam displacer/combiner 622, first nonreciprocal rotator 626, first walk-off crystal 630B, reciprocal rotator 636, second walk-off crystal 640A, second nonreciprocal rotator 646, and second beam displacer/combiner 650.

Optical circulator 1000 possesses a longitudinal axis, along which the various optical components are distributed, and a proximal and distal end. First optical port 602, and third optical port 604 are located at a proximal end, and second optical port 606 is located at a distal end of the optical circulator.

In preferable embodiments, the first, second, and third optical ports may comprise integrated optical circuits or optical fibers. In a more preferable embodiment, the first, second, and third optical ports may comprise optical fibers wherein the optical fibers comprise conventional optical fibers or thermally expanded core optical fibers. An optional imaging element may be located anywhere on the optical path between the first, second, or third optical ports such that the first and third optical ports on the proximal side and the second optical port on the distal side are conjugate images of each other. In such an embodiment, the imaging element may be a collimating lens. In a more preferable embodiment, the imaging element may be a Grin lens. In such an embodiment, the Grin lens may be located at second optical port 606, as shown, or may be located between first walk-off crystal 630B and reciprocal rotator 636, or between second walk-off crystal 640A and reciprocal rotator 636.

First beam displacer/combiner 622 is optically coupled distally to the first and third optical ports. In a preferable embodiment, the first beam displacer/combiner is a birefringent crystal. In a more preferable embodiment, the first beam displacer/combiner comprises Yttrium Orthovanadate, calcite, rutile or alpha-BBO. First nonreciprocal rotator 626 comprises a Non-reciprocal Faraday polarization rotator and is optically coupled distally from the first beam displacer/combiner. In a preferable embodiment, the first nonreciprocal rotator comprises yttrium-iron-garnet (YIG), or Bi-added thick film crystals. In a more preferable embodiment, the Bi-added thick film crystals comprise a combination of, for example, $(YbTbBi)_3Fe_5O_{12}$ and $(GdBi)_3(FeAlGa)_5O_{12}$, or of Y.I.G. and $Y_{3-x}Bi_xFe_5O_{12}$. First walk-off crystal 630B is optically coupled distally from the first nonreciprocal rotator. In a preferable embodiment, the first walk-off crystals comprise YVO4, calcite, rutile, or alpha-BBO. Reciprocal rotator 636 is optically coupled distally from the first walk-off crystals. In a preferable embodiment, the reciprocal rotator comprises a reciprocal rotator plate. In a more preferable embodiment, the reciprocal rotator comprises a low order half-wave plate. In a still more preferable embodiment, the reciprocal rotator comprises a zeroeth order half-wave plate. The first nonreciprocal rotator, first walk-off crystal, and reciprocal rotator define a first partial gap 628 in the optical path. Second walk-off crystal 640A is optically coupled distally from the reciprocal rotator. In a preferable embodiment, the second walk-off crystals comprise YVO4, calcite, rutile, or alpha-BBO. Second nonreciprocal rotator 646 comprises a Non-reciprocal Faraday polarization rotator and is optically coupled distally from the second walk-off crystals. In a preferable embodiment, the second nonreciprocal rotator comprises yttrium-iron-garnet (YIG), or Bi-added thick film crystals. In a more preferable embodiment, the Bi-added thick film crystals comprise a combination of, for example, $(YbTbBi)_3Fe_5O_{12}$ and $(GdBi)_3(FeAlGa)_5O_{12}$, or of Y.I.G. and $Y_{3-x}Bi_xFe_5O_{12}$. The reciprocal rotator, second walk-off crystal and nonreciprocal rotator define a second partial gap 642 in the optical path. Second beam displacer/combiner 650 is optically coupled distally from the second nonreciprocal rotator and proximally from the second optical port.

In operation, arbitrarily polarized light exits first optical port 602 and enters first beam displacer/combiner 622, which acts as a polarization sensitive beam displacement plate. The arbitrarily polarized light is decomposed into two orthogonal polarization components. Within the first beam displacer/combiner, the first component is an ordinary light ray (O-ray) and the other component is an extraordinary light ray (E-ray). The E-ray walks off diagonally from the O-ray through the first beam displacer/combiner, with the result that there is a top and bottom component. As the two light components enter first nonreciprocal rotator 626, their polarization is rotated clockwise 45 degrees while their polarization orientations remain orthogonal to each other. As the light rays enter first walk-off crystal 630B, and pass through first partial gap 628, the top polarization component enters first walk-off crystal 630B, and is walked off horizontally away from the bottom component, towards the right side of the circulator cross-section. The bottom component passes through the first partial gap with no walk-off effect occurring.

The light rays next go through reciprocal rotator 636, and both polarization components are rotated 90 degrees. The top component then enters second partial gap 642 without being walked-off. The bottom component enters second walk-off crystal 640A as an E-ray and is walked off horizontally in the same direction as the walk-off effect produced by first walk-off crystal 630B. As the two polarization components travel through second nonreciprocal rotator 646, their polarization orientation will be rotated 45 degrees counter-clockwise.

The clockwise/counter-clockwise nature of the first and second nonreciprocal rotators may be reversed if desired, such that the first nonreciprocal rotator rotates light 45 degrees counter-clockwise and the second nonreciprocal rotator rotates light 45 degrees clockwise. Second beam displacer/combiner 650 serves to recombine the two components, with the recombined light emerging and being imaged at second optical port 606. Arbitrarily polarized light entering second optical port 606 will travel in the opposite direction, and will exit at third optical port 604. This creates optical circulation. It should be noted that optical circulator 600 is a variation of a symmetrical beam path, cascaded walk-off configuration, which is a type of embodiment contemplated as within the scope of the present invention.

The operation of the optical circulator embodiment shown in FIG. 10 is illustrated in the cross sectional schematic representations shown in FIGS. 11A–B. FIG. 11A shows how the two orthogonal components of arbitrarily polarized light entering at first optical port 602 are manipulated so as to arrive at second optical port 606. The two arbitrarily polarized orthogonal components are shown at cross section A—A, as they exit first optical port 602 and enter the first beam displacer/combiner. At cross-section B—B, upon exiting the first beam displacer/combiner, the top component is shown as being walked off diagonally from the bottom component. At cross-section C—C, upon exiting first non-reciprocal rotator 626, the polarization of both components is shown as being rotated by 45 degrees clockwise. At cross-section D—D, upon exiting first walk-off crystal 630B and first partial gap 628, the top component is walked-off horizontally to the right side of the cross-section. At cross-section E—E, upon exiting reciprocal rotator 636, the polarization of the two components is shown rotated by 90 degrees. At cross-section F—F, upon exiting second walk-off crystal 640A and second partial gap 642, the bottom component is shown as being walked-off in the same direction as was the top component in cross-section B—B. At cross-section G—G, upon exiting second nonreciprocal rotator 446, the polarization of the components is rotated counter-clockwise by 45 degrees. At cross-section H—H, upon exiting second beam displacer/combiner 650, the two components are recombined to exit at second optical port 606.

FIG. 11B shows how the two orthogonal components of arbitrarily polarized light entering at second optical port 606 are manipulated so as to arrive at third optical port 604. The two arbitrarily polarized orthogonal components are shown at cross section H—H as they enter the second beam displacer/combiner. At cross-section G—G, the bottom component is shown as walking off diagonally from the top component, thus creating a top and bottom component. At cross-section F—F, the polarization of both components is shown as rotating 45 degrees counter-clockwise. At cross-section E—E, no change occurs. At cross-section D—D, the polarization of the two components rotates by 90 degrees. At cross-section C—C, no change occurs. At cross-section B—B the polarization of the components rotates clockwise by 45 degrees. At cross-section A—A, the two components are recombined to exit at third optical port 604.

In another aspect of the invention, only one lens for the circulator, leading to fewer optical elements compared to conventional circulator designs. Further, as compared to some conventional circulator designs, embodiments according to the present invention are not required to precisely match the center walk-off crystal length to the beam displacer/combiner crystal length. Additionally, in comparison with some conventional circulator designs, the present invention does not require aligning two perpendicular polarizations to be parallel. U.S. patent application Ser. Nos. 09/135,083, filed Aug. 17, 1998, entitled "Compact Polarization Insensitive Circulators with Simplified Structure and Low Polarization Mode Dispersion;" and 09/186,751, filed Nov. 5, 1998, entitled "Optical Circulators Using Beam Angle Turners," both of which are incorporated by reference in their entirety, may contain useful additional information about optical circulators.

Figure 12:
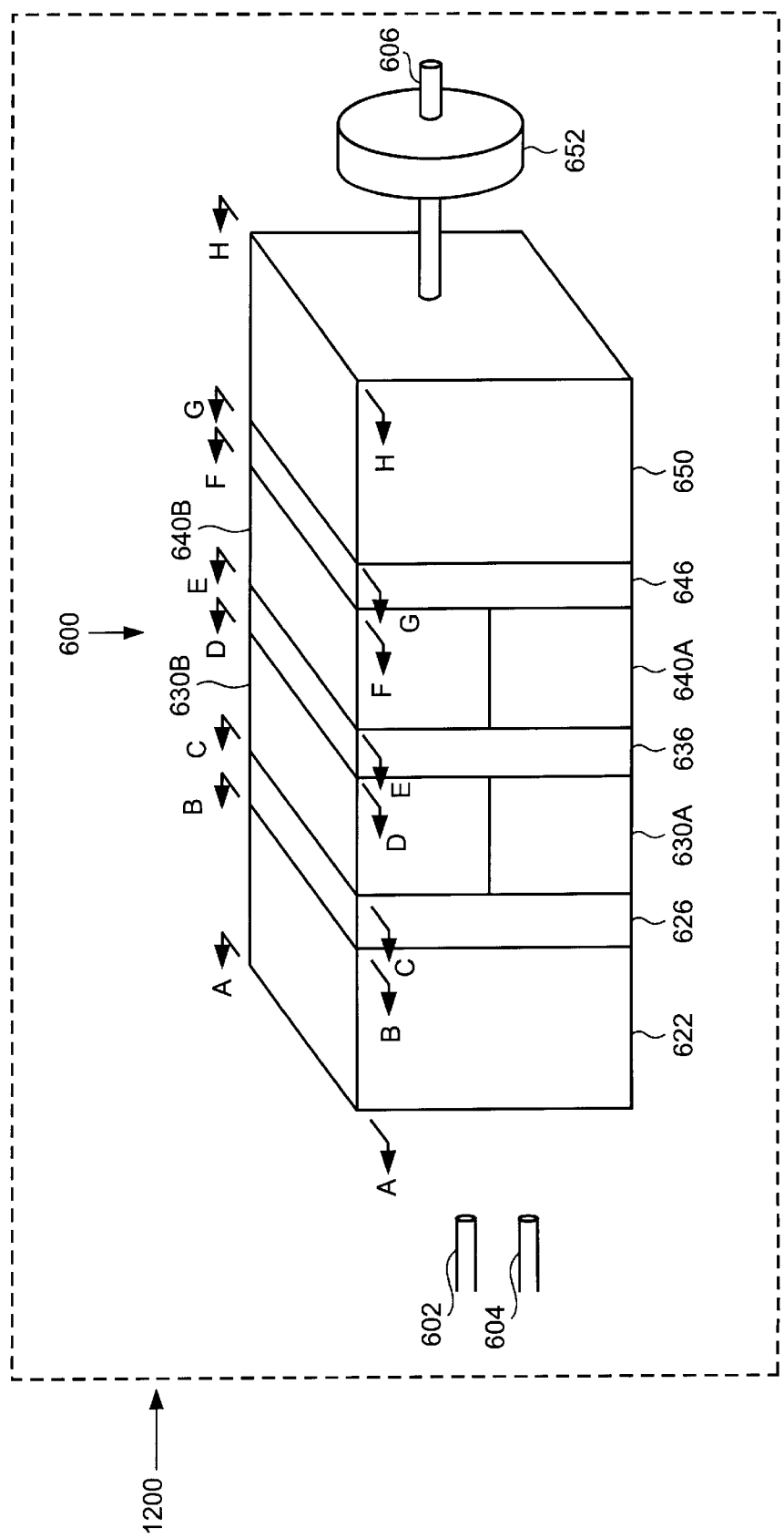
FIG. 12 shows a device that comprises an optical ciculator according to the invention.

FIG. 12 shows a device 1200 that comprises an optical circulator 600 according to the invention. In various embodiments of the invention, device 1200 may comprise a wavelength division multiplexer, an Erbium-doped amplifier, an add-drop multiplexer, a dispersion compensator, and optical time domain reflectometer, or a optical circulator comprising at least four optical ports.

It will be apparent to those skilled in the art that various modifications and variations can be made in the circulators, systems and methods of the present invention without departing from the spirit or scope of the invention. Thus, it is intended that the present invention cover the modifications and variations of this invention provided they come within the scope of the appended claims and their equivalents.

What is claimed is:

1. An optical circulator possessing a longitudinal axis, the optical circulator comprising:
   first and second walk-off crystals optically coupled in a equivalent optical distance, cascaded walk-off configuration, and wherein the optical circulator further comprises a low order half wave plate, and the low order half wave plate being located between and adjacent to each of the first and second walk-off crystals along the longitudinal axis.

2. The optical circulator of claim 1, wherein either the first or second walk-off crystal comprises Yttrium Orthovanadate, calcite, rutile or alpha-BBO.

3. The optical circulator of claim 1, wherein either the first or second walk-off crystals comprise a pair of birefringent crystals.

4. The optical circulator of claim 1, wherein the reciprocal rotator comprises a zeroeth order half wave plate.

5. The optical circulator of claim 1, further comprising first and second nonreciprocal rotators, the first nonreciprocal rotator being optically coupled proximally from the first walk-off crystal along the longitudinal axis, and the second nonreciprocal rotator being optically coupled distally from the second walk-off crystal along the longitudinal axis.

6. The optical circulator of claim 1, further comprising first and second nonreciprocal rotators, the first nonreciprocal rotator being optically coupled proximally from the first walk-off crystal along the longitudinal axis, and the second nonreciprocal rotator being optically coupled distally from the second walk-off crystal along the longitudinal axis.

7. The optical circulator of claim 6, wherein the first or second nonreciprocal rotator comprises yttrium-iron-garnet (YIG), or Bi-added thick film crystals.

8. The optical circulator of claim 7, wherein the first or second walk-off crystals comprise a birefringent crystal.

9. The optical circulator of claim 8, wherein the first or second beam walk-off crystals comprise Yttrium Orthovanadate, calcite, rutile or alpha-BBO.

10. The optical circulator of claim 6, further comprising first and second beam combiner/displacers, the first beam combiner/displacer being optically coupled proximally from the first nonreciprocal rotator along the longitudinal axis, and the second beam combiner/displacer being optically coupled distally from the second nonreciprocal rotator along the longitudinal axis.

11. The optical circulator of claim 10, wherein a direction of beam displacement or of combining of polarization component optical beams propagating along the longitudinal axis is rotated by rotating an optical orientation of the first or second combiner/displacers.

12. The optical circulator of claim 10, further comprising at least one imaging element, optically coupled to either of the first or second beam combiner/displacers.

13. The optical circulator of claim 12, wherein the imaging element comprises a gradient index lens.

14. The optical circulator of claim 1, wherein a number of walk-offs in a substantially same direction incurred by a polarization component optical beam propagating along a circulating beam path comprises two or more walk-offs.

15. The optical circulator of claim 14, wherein the number of walk-offs comprises three or more.

16. The optical circulator of claim 1, wherein the substantially equivalent optical distance, cascaded walk-off configuration is a symmetrical beam path, cascaded walk-off configuration.

17. The optical circulator of claim 1, further comprising optical ports, optically coupled to the walk-off crystals, the optical ports comprising optical fibers.

18. The optical circulator of claim 17, wherein the optical fibers comprise thermal expanded core optical fibers.

19. The optical circulator of claim 17, wherein the optical circulator comprises three or more optical ports.

20. The optical circulator of claim 19, wherein the optical circulator comprises four or more optical ports.

21. The optical circulator of claim 1, further comprising a first or a second partial gap, optically coupled in parallel with either the first or second walk-off crystal, respectively.

22. A wavelength division multiplexer comprising the optical circulator of claim 1.

23. An Erbium-doped amplifier comprising the optical circulator of claim 1.

24. An add-drop multiplexer comprising the optical circulator of claim 1.

25. A dispersion compensator comprising the optical circulator of claim 1.

26. An optical time domain reflectometer comprising the optical circulator of claim 1.

27. An optical circulator having a longitudinal axis comprising:
   a first beam displacer/combiner that displaces at least one optical beam into two polarized component beams and combines at least two polarized component beams to form an optical beam;
   a first nonreciprocal rotator, optically coupled to the first beam displacer/combiner distally along the longitudinal axis, for rotating a polarization orientation of the polarized component beams;
   a first walk-off crystal, optically coupled to the first nonreciprocal rotator distally along the longitudinal axis, for walking-off only one of the polarized component beams;
   a second walk-off crystal, optically coupled to the first walk-off crystal distally along the longitudinal axis, for walking-off the other polarized component beams;
   a reciprocal rotator, optically coupled distally from and adjacent to the first walk-off crystal and proximally from and adjacent to the second walk-off crystal;
   a second nonreciprocal rotator, optically coupled to the second walk-off crystal distally along the longitudinal axis, for rotating the polarization orientation of the polarized component beams; and
   a second beam displacer/combiner, optically coupled to the second nonreciprocal rotator distally along the longitudinal axis, that displaces at least one optical beam into two polarized component beams and combines at least two polarized component beams to form an optical beam.

28. A method of circulating optical signals comprising:
   optically coupling a first and second walk-off crystal in an equivalent optical distance, cascaded walk-off, configuration, and
   optically coupling a low order half wave plate between and adjacent to each of the first and second walk-off crystals.

29. The method of claim 28, wherein a direction of beam displacement or of combining of polarization component optical beams propagating along a longitudinal axis is rotated by rotating an optical orientation of a first or second combiner/displacer optically coupled to the first or second walk-off crystal.

* * * * *